United States Patent [19]
Nishimura

[11] Patent Number: 6,104,881
[45] Date of Patent: *Aug. 15, 2000

[54] CAMERA HAVING DEVICE THAT OPENS AND CLOSES LIGHT LOCK DOOR OF FILM CARTRIDGE

[75] Inventor: Tomoki Nishimura, Kawasaki, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/042,661

[22] Filed: Mar. 17, 1998

[30] Foreign Application Priority Data

Mar. 18, 1997 [JP] Japan .................................. 9-064829

[51] Int. Cl.[7] .................................................. G03B 17/24
[52] U.S. Cl. ........................... 396/144; 396/349; 396/418
[58] Field of Search ..................................... 396/348, 349, 396/387, 439, 513, 516, 535, 538, 411, 418, 133, 134, 144

[56] References Cited

U.S. PATENT DOCUMENTS 5,664,249  9/1997  Okuno et al. ............................ 396/538
5,697,263  12/1997  Funahashi et al. ................. 396/387 X

*Primary Examiner*—David M. Gray
*Attorney, Agent, or Firm*—Oliff & Berridge, PLC

[57] ABSTRACT

A camera with a device that opens and closes a light lock door of a film cartridge loaded in the camera includes a drive source that moves a photographing lens barrel, and an opening/closing mechanism that uses the drive source to open and close the light lock door. A moving mechanism moves the photographing lens barrel. A switching mechanism is coupled to the drive source, and transmits a driving force from the drive source to a selected one of the moving mechanism and the opening/closing mechanism. When an inhibiting device inhibits movement of the photographing lens barrel and the movement mechanism of the photographing lens barrel, the switching mechanism transmits the driving force to the opening/closing mechanism for the light lock door. When the inhibiting device does not inhibit movement of the photographing lens barrel and its moving mechanism, a braking device prevents the opening/closing mechanism from moving so that the driving force is only supplied to the moving mechanism of the photographing lens barrel.

13 Claims, 10 Drawing Sheets

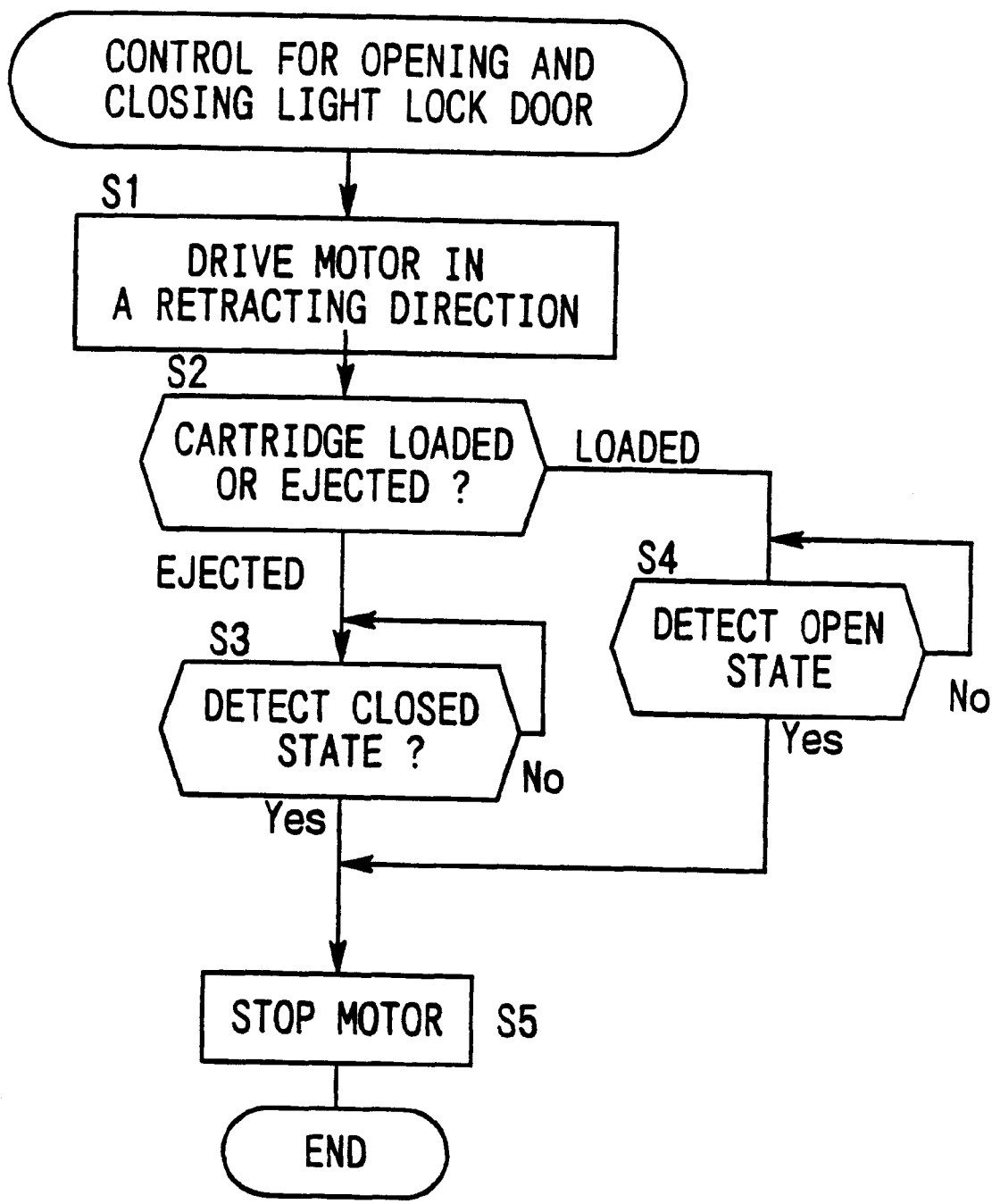

CAMERA HAVING DEVICE THAT OPENS AND CLOSES LIGHT LOCK DOOR OF FILM CARTRIDGE

INCORPORATION BY REFERENCE

The disclosure of the following priority application is herein incorporated by reference:

Japanese Patent Application No. 9-64829 filed Mar. 18, 1997.

BACKGROUND OF THE INVENTION

1. Field of the Invention

The present invention relates to a camera having a device that opens and closes a light lock door of a film cartridge that is loaded in the camera.

2. Description of the Related Art

There is known a film cartridge which allows a film to be delivered from a film slot provided with a light lock door. A camera using such a film needs to include a light lock door opening/closing mechanism which opens the light lock door of the film after cartridge loading the film cartridge in a cartridge chamber, and making the interior of the cartridge shielded from external light.

Conventional cameras are constructed such that the light lock door is opened in accordance with movement of a lock mechanism for locking a door of the cartridge chamber. Thus, the light lock door is opened at the same time that the door of the cartridge chamber is locked after loading of the film cartridge.

In the conventional light lock door opening/closing mechanism, however, the light lock door is opened in accordance with movement of the door lock mechanism of the cartridge chamber, and it is therefore difficult to ensure appropriate timing of opening the cartridge chamber and opening or closing the light lock door. When the cartridge is loaded, for example, the light lock door must be opened after the cartridge chamber is completely closed. When the cartridge is ejected, on the other hand, the cartridge chamber must be released or opened after the light lock door is completely closed. With this conventional interlocking mechanism, it is difficult to adjust the timing of opening or closing the light lock door, in relation to the timing of opening or closing the door of the cartridge chamber.

Since the cartridge chamber is locked at the same time that the light lock door is opened in the conventional mechanism, a large force is required for locking the cartridge chamber, causing a problem that the handling ease in use of the camera deteriorates.

SUMMARY OF THE INVENTION

It is therefore an object of the present invention to provide a camera having a device that is able to open and close a light lock door of a film cartridge in appropriate timing with high reliability, assuring improved handling ease.

To accomplish the above object, the present invention provides a camera including a device that opens and closes a light lock door of a film cartridge loaded in the camera, comprising: a drive source that moves a photographing lens barrel; and an opening/closing mechanism that uses the drive source to open and close the light lock door.

BRIEF DESCRIPTION OF THE DRAWINGS

FIG. 9 is a flowchart of a routine according to which opening and closing of the light lock door of the film cartridge is controlled.

DESCRIPTION OF THE PREFERRED EMBODIMENT(S)

Referring to FIG. 1 through FIG. 9, a camera having a device that opens and closes a light lock door of a film cartridge according to one embodiment of the present invention will be described.

Figure 1:
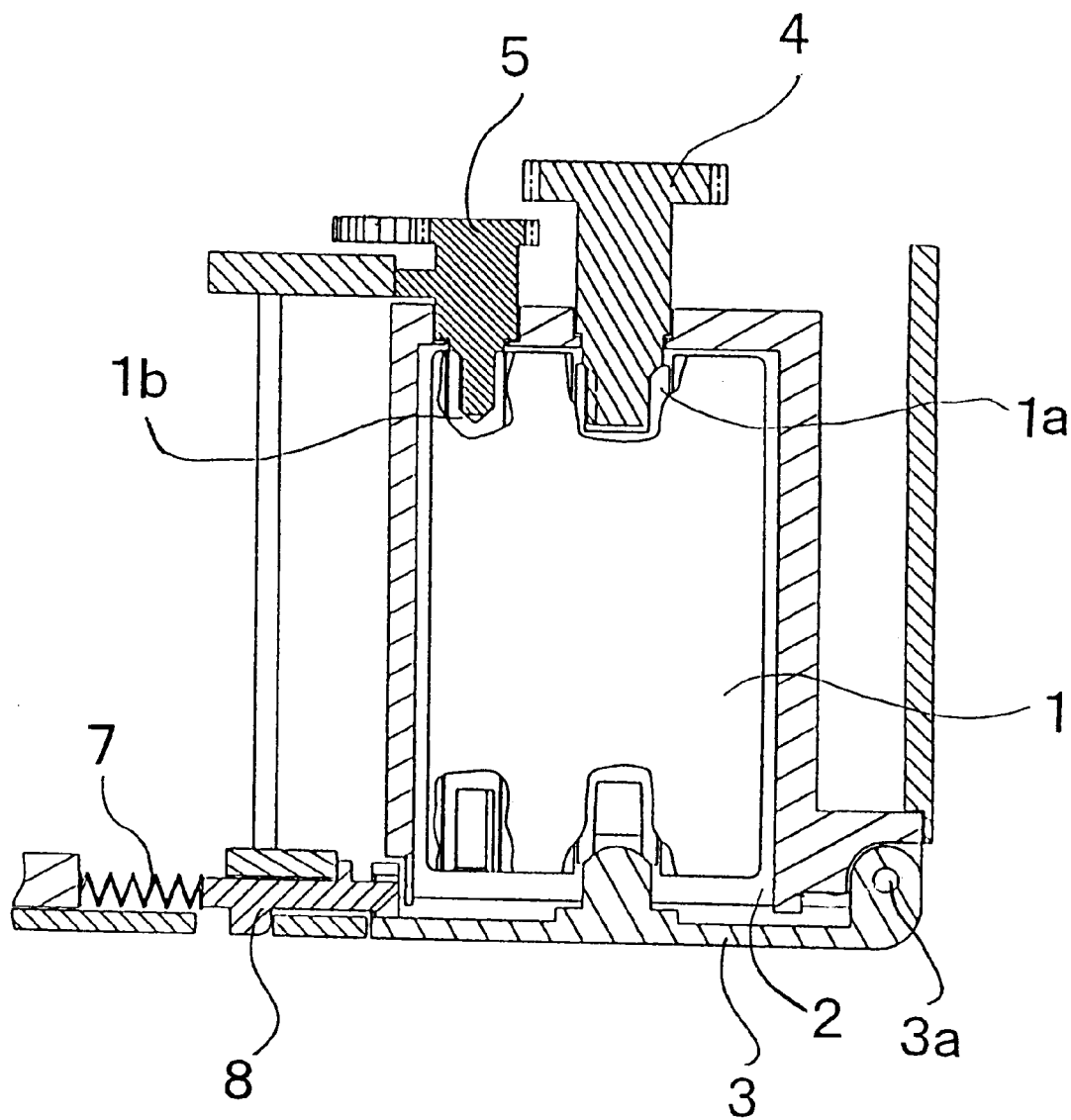
FIG. 1 is a cross sectional view showing the vicinity of a cartridge chamber of a camera having a device that opens and closes a light lock door of a film cartridge according to one embodiment of the present invention.

FIG. 1 shows a state in which a film cartridge is loaded in the camera of the present embodiment having a device that opens and closes a light lock door of the film cartridge. In FIG. 1, reference numeral 1 denotes a film cartridge, 1a denotes a film spool member for winding a film in the film cartridge 1, 1b denotes a light-lock-door opening/closing shaft for opening and closing a light lock door (not shown) of the film cartridge 1, 2 denotes a cartridge chamber that contains the film cartridge 1, 3 denotes a cartridge chamber door provided at the bottom face of the camera for opening and closing the cartridge chamber 2, 4 is a film transport fork that engages with the film spool member 1a, and 5 denotes a light-lock-door driver that engages with the light-lock-door opening/closing shaft 1b.

As shown in FIG. 1, the cartridge chamber door 3 is mounted to pivot about a pivot shaft 3a, and is retained in a closed state by means of a door opening/closing member 8 under a bias force of a spring 7. When the film cartridge 1 is loaded in the cartridge chamber 2, and the cartridge chamber door 3 is closed, the film spool member 1a engages with the transport fork 4, and the light-lock-door opening/closing shaft 1b engages with the light-lock-door driver 5. After the light-lock-door driver 5 is driven to open the light lock door, the transport fork 4 is rotated so that the film is delivered (thrust) out of the film cartridge 1.

Figure 2:
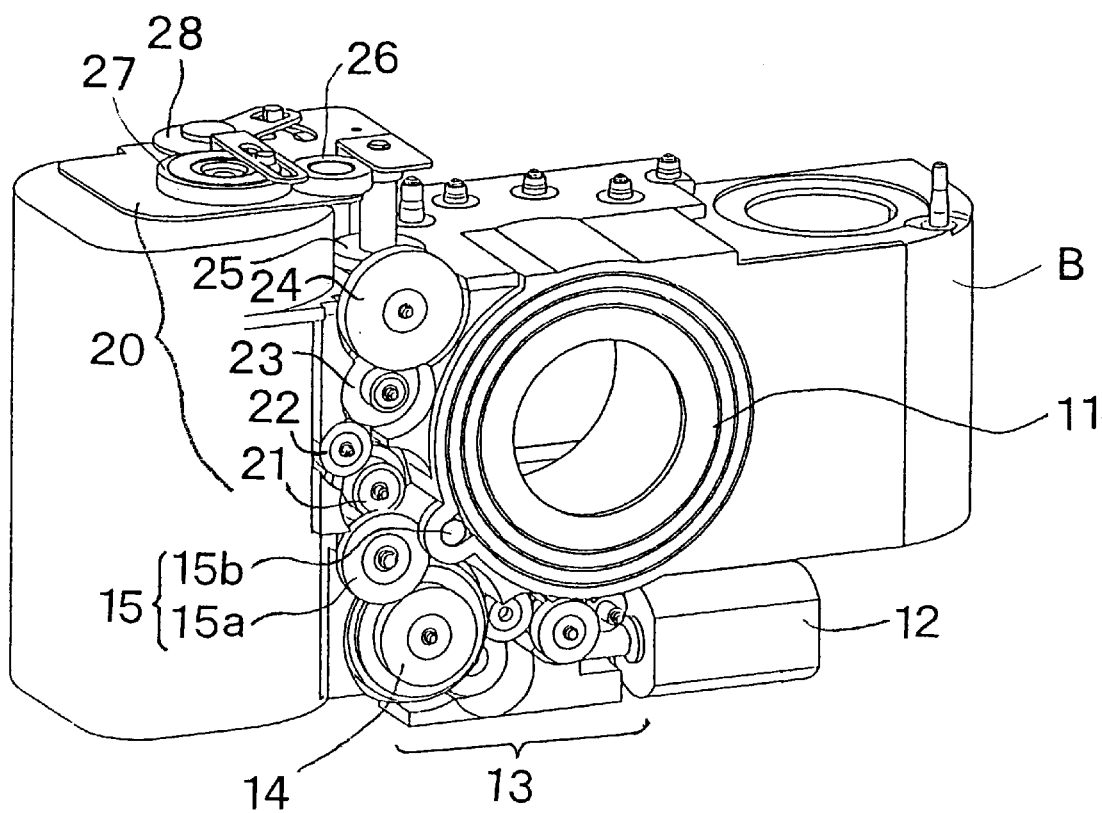
FIG. 2 is a perspective view showing the device of the present embodiment that opens and closes the light lock door of the film cartridge.
Figure 3:
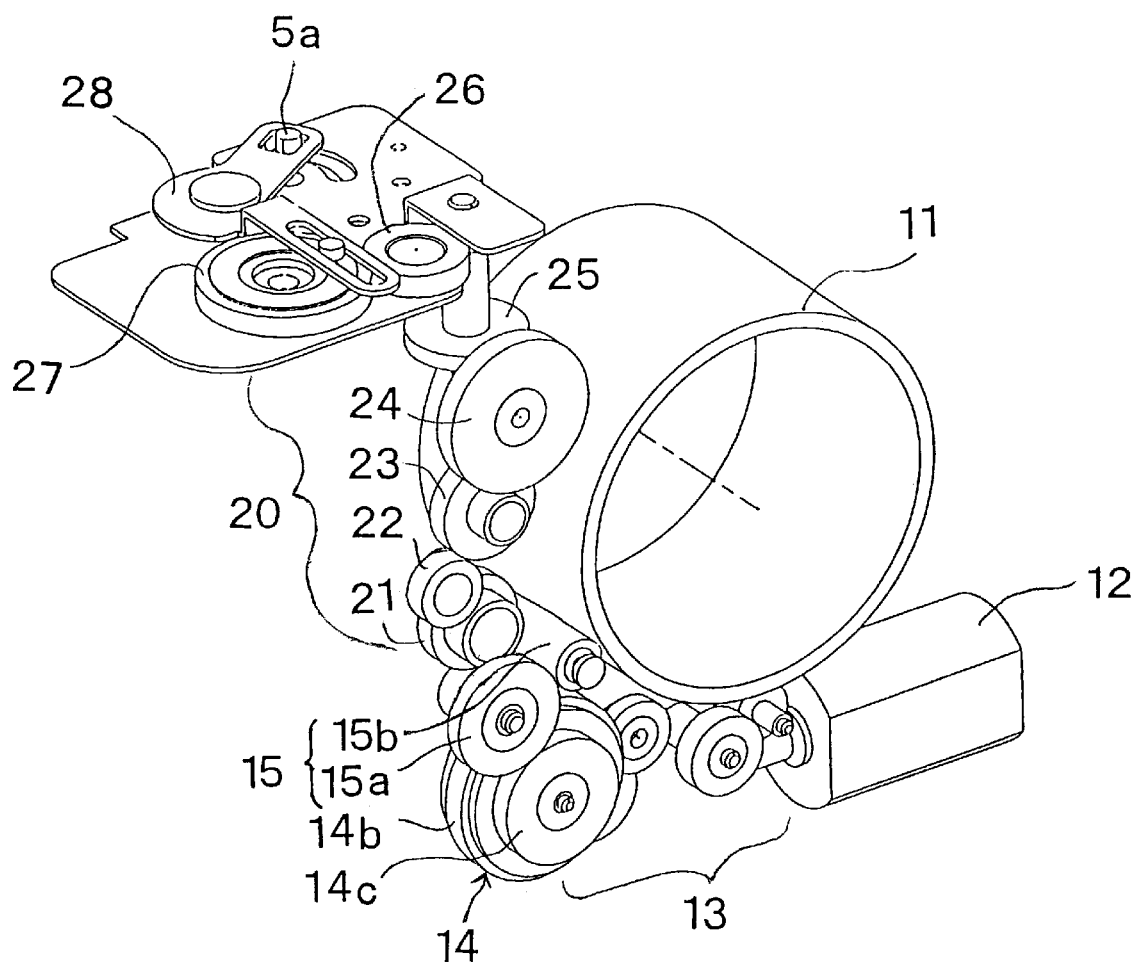
FIG. 3 is a perspective view showing details of the device of the present embodiment that opens and closes the light lock door of the film cartridge.

In FIG. 2, B denotes a camera body, and in FIGS. 2 and 3, reference numeral 11 denotes a photographing lens barrel that is mounted to be able to protrude to the front of the camera, 12 denotes a motor that advances and retracts the lens barrel 11, and also opens and closes the light lock door of the film cartridge 1, 13 denotes a common drive system that transmits a driving force of the motor 12, and 14 denotes differential planetary gears for dividing the driving force transmitted from the common drive system 13, into a driving force for advancing and retracting the lens barrel 11, and a driving force for opening and closing the light lock door of the film cartridge 1. Reference numeral 15 denotes a barrel drive gear train that transmits the driving force divided by the differential planetary gears 14 to the lens barrel 11, and 20 denotes a light-lock-door drive system that transmits the driving force divided by the differential planetary gears 14 toward the light-lock-door opening/closing driver 5.

Figure 4A:
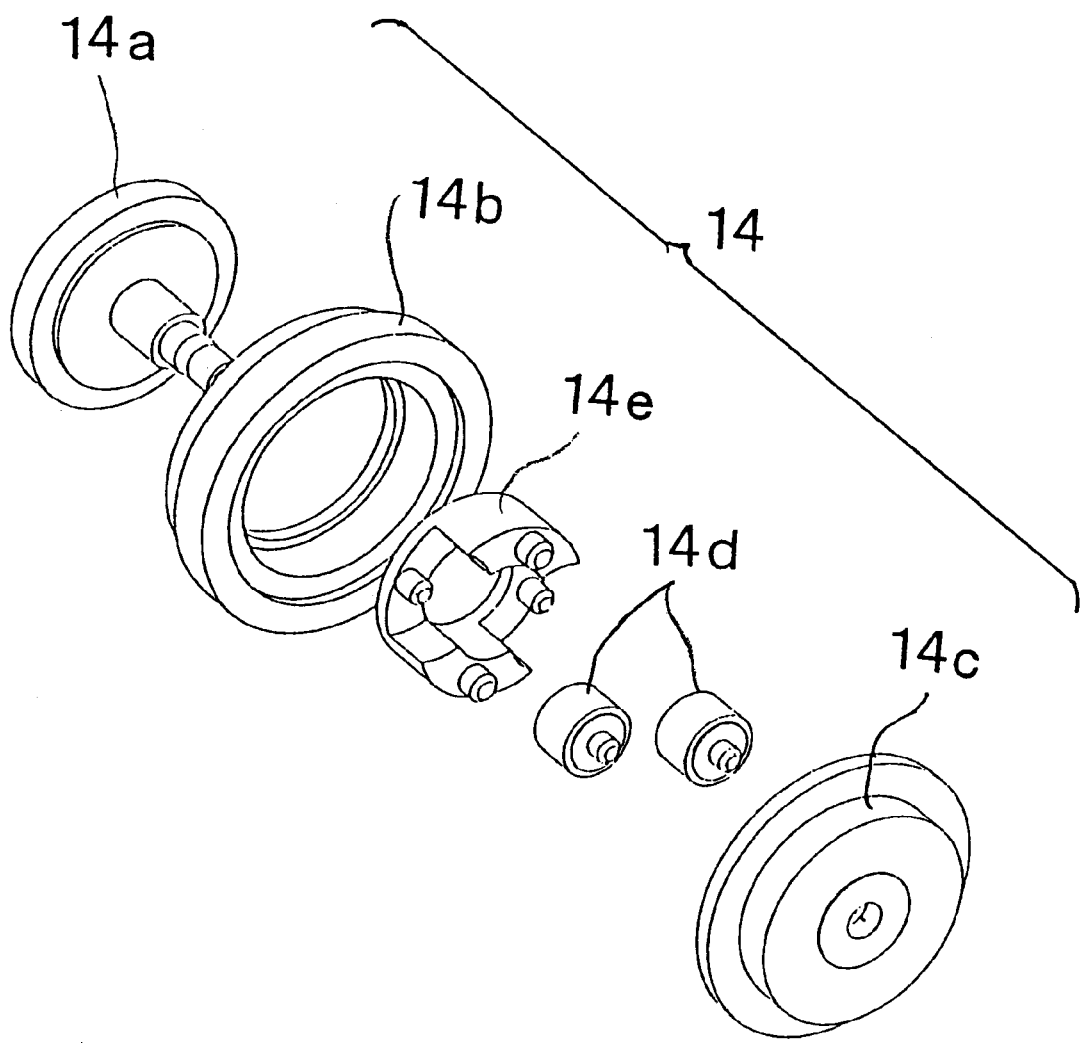
FIG. 4A is an exploded perspective view showing differential planetary gears of the device of the present embodiment that opens and closes the light lock door of the film cartridge.
Figure 4B:
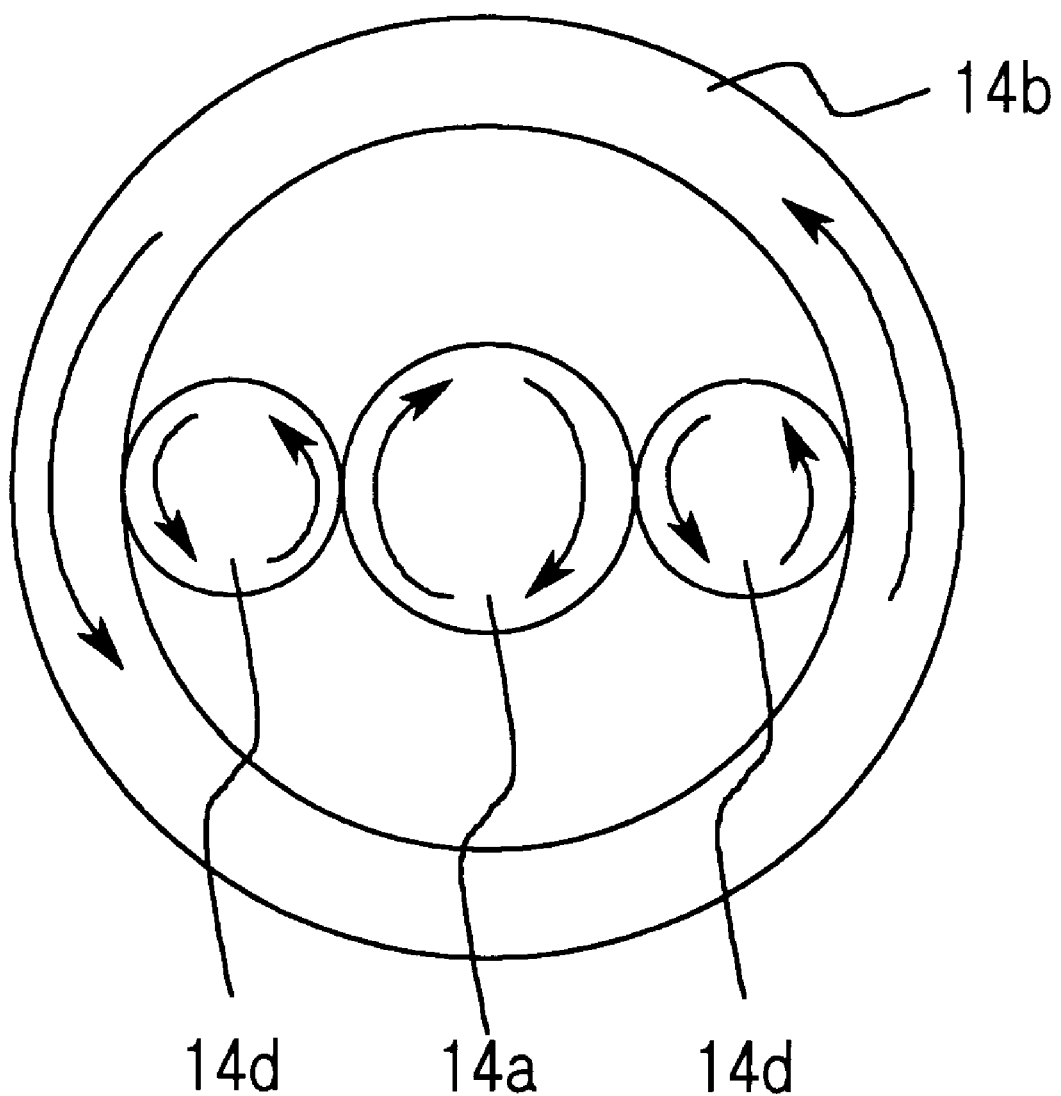
FIG. 4B is a view schematically representing the relationship among a shaft portion of a driven gear, a light-lock-door driving side gear, and inner gears.

As shown in FIG. 4A, the differential planetary gears 14 consist of a driven gear 14a that engages (or meshes) at its outer circumferential portion with the common drive system 13, a light-lock-door driving side gear 14b that engages at its outer circumferential portion with the light-lock-door drive system 20, a barrel driving side gear 14c that engages at its outer circumferential portion with a gear 15a of the barrel drive gear train 15, inner gears 14d which engage with the driven gear 14a and light-lock-door driving side gear 14b, and whose shafts are inserted into bearings (not shown) of the barrel driving side gear 14c, and a gear holder portion 14e that supports the inner gears 14d such that these gears 14d can revolve about themselves and revolve about the axis of other gears like the earth revolves about the sun. FIG. 4B is a view schematically showing the relationship in the differential planetary gears 14 among a shaft portion of the driven gear 14a, light-lock-door driving side gear 14b, and the inner gears 14d.

While gear portions of the driven gear 14a, light-lock-door driving side gear 14b, barrel driving side gear 14c and inner gears 14d are not illustrated in FIG. 4A, the inner gears 14d engage (or mesh) with the driven gear 14a and light-lock-door driving side gear 14b, and each shaft of the inner gears 14 is inserted into a bearing (not shown) provided in the barrel driving side gear 14c, while the driven gear 14a, light-lock-door driving side gear 14b and barrel driving side gear 14c do not engage with each other. With the inner gears 14d revolving with the gear holder portion 14e about the axis of other gears, while revolving about themselves, the ratio of relative rotations of the driven gear 14a, light-lock-door driving side gear 14b and barrel driving side gear 14c is maintained at a constant value.

As shown in FIG. 2 and FIG. 3, the light-lock-door driving system 20 consists of gears 21–27 and a lever 28 for opening or closing the light lock door. A driving force received from a gear (not shown) that engages with the light-lock-door driving side gear 14b is successively transmitted through the gears 21–27 and the light-lock-door opening/closing lever 28.

Figure 5:
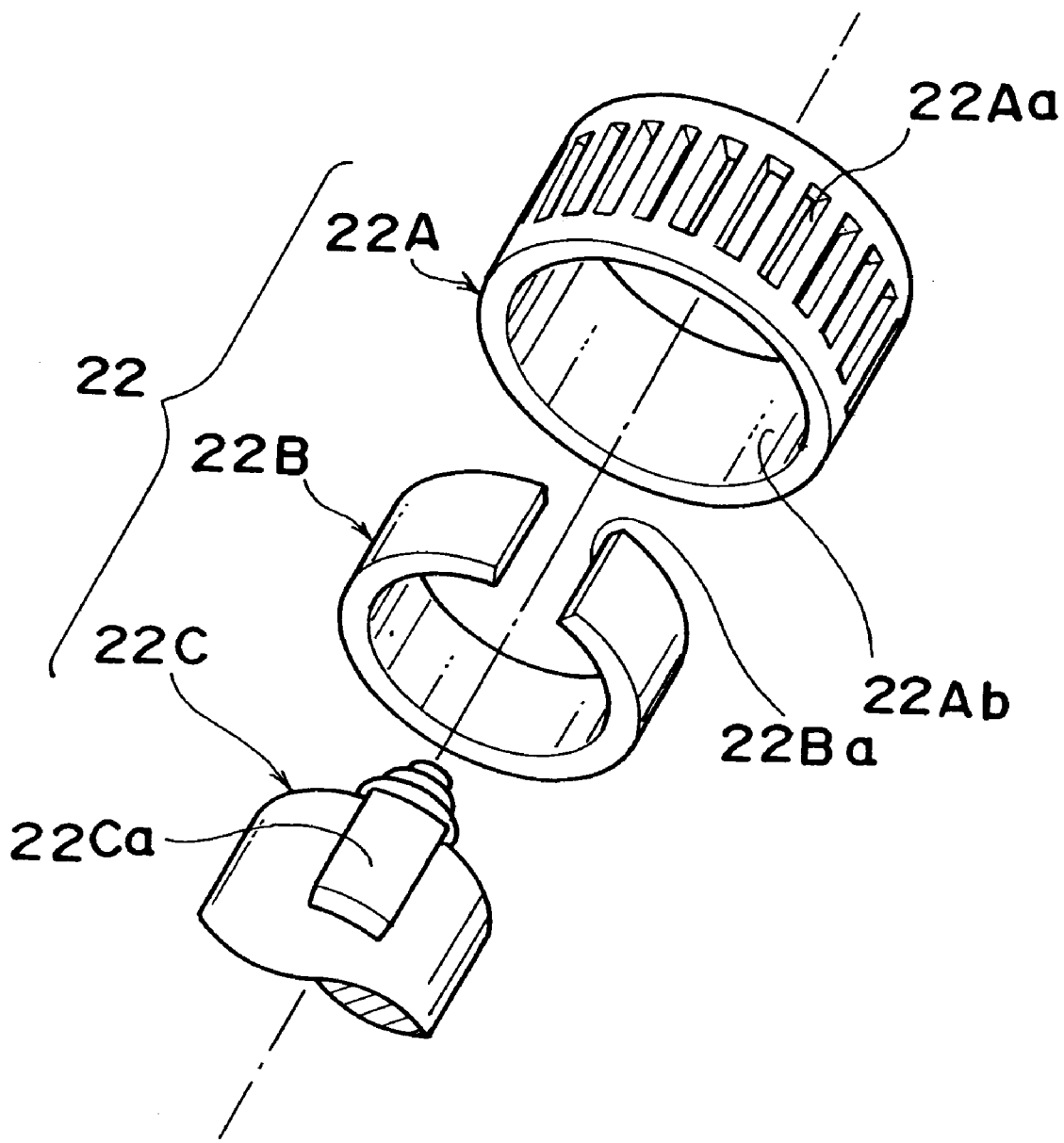
FIG. 5 is an exploded perspective view showing a gear including a slip mechanism.

One of the gears 22 (gear with a slip mechanism) that constitutes the light-lock-door driving system 20 is provided with a slip mechanism. As shown in FIG. 5, the gear 22 consists of a generally cylindrical gear member 22A formed at its outer circumferential portion with a gear portion 22Aa, a cylindrical spring 22B that is pressed against an inner circumferential wall 22Ab of the gear member 22A due to its spring force, and a support shaft 22C including a protrusion 22Ca that is fitted in a cut-out portion 22Ba of the cylindrical spring 22B. As shown in FIG. 2 and FIG. 3, the gear portion 22Aa engages with the gear 21 and the gear 23.

The support shaft 22C is fixed with respect to the camera body B, and therefore rotation of the cylindrical spring 22B is inhibited when the protrusion 22Ca of the support shaft 22 is fitted into the cut-out portion 22Ba of the cylindrical spring 22B. The cylindrical spring 22B is pressed against the inner circumferential wall 22Ab of the gear member 22A due to its own spring force, and thus a friction force arises between the inner circumferential wall 22Ab and the cylindrical spring 22B. With this arrangement, the gear member 22A is able to start rotating only when it receives from the gear 21 a driving force that is equal to or larger than a certain force that can oppose this friction force, and transmit the driving force to the gear 23. Thus, the gear 22 exerts a braking force based on the frictional force of the slip mechanism.

Figure 6:
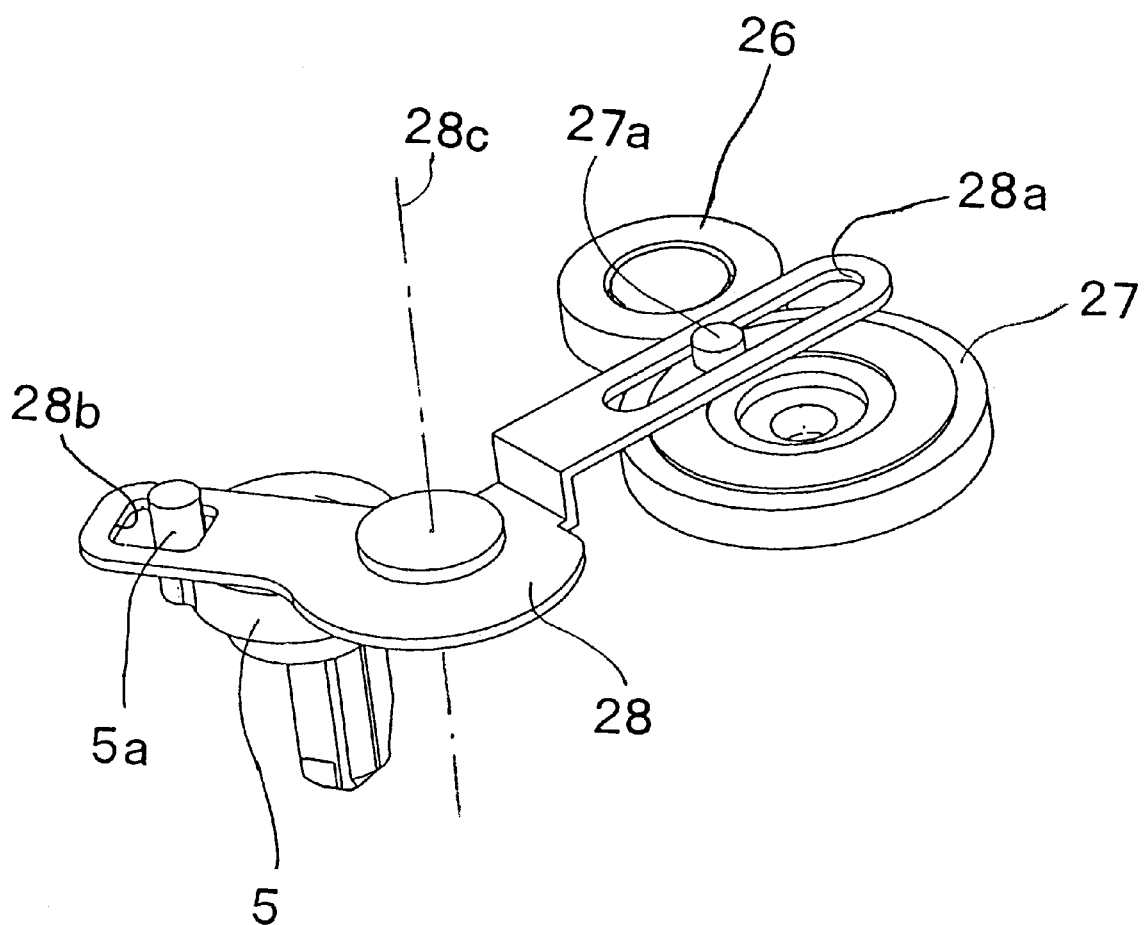
FIG. 6 is a perspective view showing the vicinity of a light-lock-door opening/closing lever.

Referring to FIG. 6, the light-lock-door opening/closing lever 28 is mounted to pivot about a pivot axis 28c. As shown in FIG. 6, a gear 27 that engages with a gear 26 is formed with a protruding portion 27a, and the protruding portion 27a is inserted through an engaging hole 28a formed at one end portion of the light-lock-door opening/closing lever 28. Another engaging hole 28b is formed at the other end portion of the light-lock-door opening/closing lever 28, and a protrusion 5a of the light-lock-door opening/closing driver 5 is inserted through the engaging hole 28b.

When the gear 26 rotates, the gear 27 engaging with the gear 26 rotates so that the protruding portion 27a moves along an arc in accordance with rotation of the gear 27. At this time, the light-lock-door opening/closing lever 28 receives a force from the protruding portion 27a via the engaging hole 28a, and pivots about the pivot axis 28c due to the applied force, in synchronization with the rotary motion of the gear 27. Due to the pivotal movement of the light-lock-door opening/closing lever 28, the protruding portion 5a of the light-lock-door opening/closing driver 5 inserted through the engaging hole 28b reciprocates in accordance with movement of the engaging hole 28b, whereby the light-lock-door opening/closing driver 5 makes reciprocative rotary motion.

As shown in FIG. 2 and FIG. 3, the gear 15a of the barrel drive gear train 15 engages with the barrel driving side gear 14c of the differential planetary gear 14, and also engages with the gear 15b of the barrel drive gear train 15.

Figure 7:
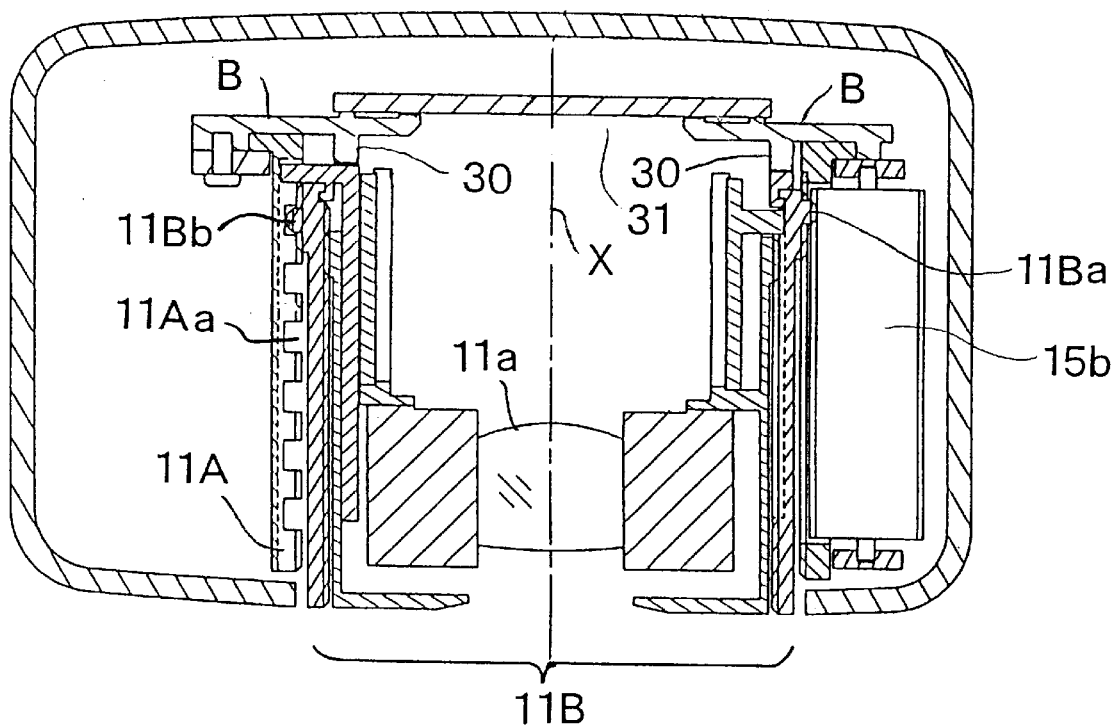
FIG. 7 is a cross sectional view showing a barrel portion.

As shown in FIG. 7, the lens barrel consists of a fixed lens barrel 11A and a movable lens barrel 11B. The fixed lens barrel 11A and movable lens barrel 11B are screwed on each other (due to engagement of screws) with a female screw 11Aa of the fixed lens barrel 11A and a male screw 11Bb of the movable lens barrel 11B. The fixed lens barrel 11A is formed with an opening, through which the male screw 11Ba of the movable lens barrel 11B engages with the gear 15b. A lens 11a is provided on the movable lens barrel 11B.

When the gear 15b rotates, a driving force is applied to the movable lens barrel 11B via a gear portion 11Ba formed on the movable lens barrel 11B, so that the movable lens barrel 11B rotates about a photographing optical axis X as an axis of rotation. Since the fixed lens barrel 11A and movable lens barrel 11B are screwed on each other as described above, the movable lens barrel 11A is moved or shifted relative to the fixed lens barrel 11B in accordance with rotation of the movable lens barrel 11B. As a result, the movable lens barrel 11B is advanced or retracted in the X direction of the optical axis.

As shown in FIG. 7, the camera body B having an aperture 31 that defines a photographing exposure range is formed with an abutting portion 30 that protrudes and abuts on the movable lens barrel 11B when the barrel 11B is in the retracted position (most retracted and received position). As the movable lens barrel 11B is retracted into the camera body B, the movable lens barrel 11B abuts on the abutting portion 30, and is thus inhibited from being further retracted.

Next, the operation of the camera constructed as described above will be described.

The film cartridge 1 is loaded in the cartridge chamber 2 while the movable lens barrel 11B of the lens barrel 11 is not fully retracted until it abuts on the abutting portion 30. At this time, the film spool member 1a of the film cartridge engages with the film transport fork 4, and the light-lock-door opening/closing shaft 1b of the film cartridge 1 engages with the light-lock door driver 5. When the cartridge chamber door 3 is closed, and then the door 3 is retained by the door opening/closing member 8, the motor 12 rotates in a direction in which the barrel is retracted. As the motor 12 rotates, a driving force of the motor 12 is transmitted to the driven gear 14a of the differential planetary gears 14, through the gear train that constitutes the common drive system 13.

At this time, the gear portion 22Aa is fixed due to the braking force of the gear 22 as shown in FIG. 5, and all gears of the light-lock-door opening/closing drive system 20 are inhibited from rotating. Accordingly, the gear 14b engaging with the gears of the light-lock-door opening/closing drive system 20 is also inhibited from rotating.

If a driving force is applied to the driven gear 14a while the gear 14b is in the fixed state, the inner gears 14d receive a reactive force from the gear 14b that is inhibited from rotating, and revolve about the axis of other gears while revolving about themselves at a rotation ratio that is determined by the construction of the differential planetary gear 14, thereby to rotate the barrel driving side gear 14c. The driving force of the gear 14c is transmitted through the gear 15a and gear 15b of the barrel drive gear train 15 in this order, so that the movable barrel 11B of the lens barrel 11 is retracted in accordance with rotation of the gear 15b.

If the movable barrel 11B abuts on the abutting portion 30 as a result of retraction of the movable barrel 11B, the movable barrel 11B cannot be retracted further, and is thus forced to stop rotating. As a result, the gear 15a and gear 15b of the gear train 15 are inhibited from rotating, and therefore the barrel driving side gear 14c of the differential planetary gears 14 which engages with the gear 15a is inhibited from rotating. Namely, revolution of the inner gears 14d about the axis of the other gears is inhibited. If the motor 12 continues to rotate in this state, a reactive force arises from the gear 14c that is fixed, and the driving force of the motor 12 is transmitted to the light-lock-door driving side gear 14b. Since the driving force of the motor 12 is set to be stronger than the braking force of the gear 22, the gear 14b and gears 21–27 start rotating in spite of the braking force of the gear 22, and the light-lock-door opening/closing driver 5 is rotated due to pivotal movement of the light-lock-door opening/closing lever 28.

In the case where the lens barrel 11 is completely retracted with the movable barrel 11B abutting on the abutting portion 30 when the film cartridge 1 is loaded, the light-lock-door opening/closing driver 5 starts rotating at the same time that the motor 12 starts rotating.

As the light-lock-door opening/closing driver 5 rotates, the light-lock-door opening/closing shaft 1b engaging with the light-lock-door opening/closing driver 5 rotates concurrently with the rotation of the driver 5, and the light lock door of the film cartridge 1 is repeatedly opened and closed in synchronization with the rotation of the light-lock-door opening/closing shaft 1b. Then, the motor 12 is stopped when it is detected that the light lock door reaches its open position, and the light lock door is stopped at the open position, thus enabling the film to be delivered (thrust). In this connection, the position of the light lock door is detected by a detecting device that is not illustrated.

If the motor 12 is rotated in the reverse direction after the light lock door is stopped at the open position, the driving force of the motor 12 is transmitted through the common drive system 13, differential planetary gears 14 and the barrel drive gear train 15, and the movable barrel 11B of the lens barrel 11 is advanced. At this time, the gear 14b of the differential planetary gears 14 that rotates with the light-lock-door opening/closing drive system 20 is inhibited from rotating due to the braking force of the gear 22, and therefore the gear 14c on the barrel driving side receives a reactive force from the gear 14b, and rotates at a predetermined rotation ratio, thus enabling the lens barrel 11 to be advanced. Since the motion of the light-lock-door opening/closing drive system 20 is stopped at this time, the light lock door is kept at the open position.

When the film cartridge 1 is ejected from the camera, the motor 12 is rotated so as to retract the lens barrel 11 until the movable barrel 11B abuts on the abutting portion 30, and the operation to open or close the light lock door is performed. Then, the motor 12 is stopped in suitable timing while the open/closed state of the light lock door is being monitored by the above-described detecting device, so that the light lock door is stopped at the closed position. Since the film is not exposed to light if the light lock door is placed in the closed position, the film cartridge 1 can be ejected out of the camera.

In the camera having the device that opens or closes the film cartridge according to the present embodiment, a door lock mechanism (not shown) is separately provided for inhibiting opening of the cartridge chamber door 3. This door lock mechanism is controlled so that the cartridge chamber door 3 can be released or opened only when the light lock door of the film cartridge 1 is closed. Thus, there is no possibility that the film is inadvertently exposed to light during photographing.

Figure 8:
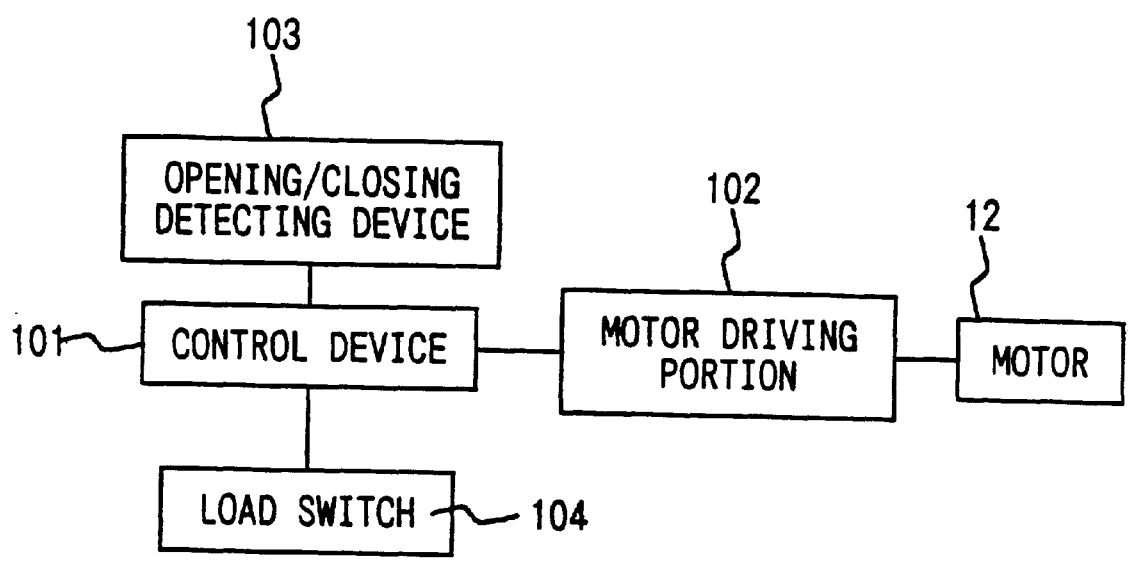
FIG. 8 is a block diagram of a control portion of the camera of the present embodiment having the device that opens and closes the film cartridge.

FIG. 8 is a block diagram of a control portion of the camera with the film cartridge opening/closing device of the present embodiment. Reference numeral 101 denotes a control device that performs control of the whole system of the camera, which device consists of a microprocessor and its peripheral circuits. Reference numeral 102 denotes a motor drive portion that drives the motor 12, and 103 denotes a detecting device that detects the open or closed state of the light lock door. For example, in FIG. 6, the light-lock-door driver 5 is provided with a protruding portion (not shown), and a leaf switch (not shown) is provided at a position corresponding to the protruding portion. In this case, the protruding portion rotates with the light-lock-door driver 5, and a contact of the leaf switch is pressed or released in accordance with the rotation of the protruding portion, so that the leaf switch is turned on and off, and opening and closing of the light lock door is detected. Reference numeral 104 is a load switch for detecting loading of the film cartridge 1, which switch is turned on when the film cartridge 1 is loaded in the cartridge chamber 2.

FIG. 9 is a flowchart showing a control routine according to which the control device 101 controls driving of the motor 12, so that closing and opening of the light lock door of the film cartridge is controlled by the device that opens or closes the light lock door of the film cartridge as described above. The present routine is initiated when the film cartridge 1 has been loaded in the camera, or when the film cartridge is to be taken out of the camera after rewinding the film upon completion of photographing.

In step S1, the control device 101 controls the motor driving portion 102 so as to drive the motor 12. The motor 12 is rotated in the direction in which the photographing lens barrel 11 is retracted into the camera. With the motor 12 thus driven, the device that opens or closes the light lock door of the film cartridge as described above is actuated. In step S2, it is determined whether control in the current cycle is that to be performed immediately after the film cartridge 1 is loaded or that to be performed before the film cartridge 1 is ejected. Loading of the film cartridge 1 is determined by detecting that the load switch 104 is switched from the OFF state into the ON state. When the present routine is started by detecting the ON-state of the switch 104, it means that the camera is in a state immediately after the film cartridge 1 is loaded. When a routine for rewinding the film after completion of photographing is started, and the present routine is started following the rewinding routine, it means that the camera is in a state before the film cartridge 1 is ejected. The control device 101 is able to detect each of the states by checking various flags, or the like.

If step S2 determines that the film cartridge 1 is to be ejected, the control flow goes to step S3 to wait until the opening/closing detecting device 103 detects the closed state of the light lock door of the film cartridge. The light lock door is initially in the open state in the case where the film cartridge 1 is to be ejected. Once the device that opens or closes the light lock door of the film cartridge as described above is actuated, the light lock door may be brought into the closed state after going through certain operations of the light lock door opening/closing device. If step S3 determines that the light lock door is in the closed state, step S5 is then executed to control the motor drive portion 102, so as to stop the motor 12. As a result, the light lock door is placed in the closed state.

If step S2 determines that the film cartridge 1 is to be loaded, on the other hand, the control flow goes to step S4 to wait until the opening/closing detecting device 103 detects the open state of the light lock door of the film cartridge. The light lock door is initially in the closed state in the case where the film cartridge 1 is to be loaded. Once the device that opens or closes the light lock door of the film cartridge as described above is actuated, the light lock door may be brought into the open state after going through certain operations of the light lock door opening/closing device. If step S4 determines that the light lock door is in the open state, step S5 is then executed to control the motor drive portion 102, so as to stop the motor 12. As a result, the light lock door is placed in the open state.

As described above, in the present embodiment, the driving force of the motor 12 for advancing and retracting the lens barrel 11 is used for opening and closing the light lock door of the film cartridge 1. After the lens barrel 11 is retracted, or after it is confirmed that the barrel 11 is in the retracted position, the light lock door of the film cartridge 1 is caused to be opened. Since the opening/closing motion of the light lock door of the film cartridge is not associated with the operation of the cartridge door 3 as in the known device, the timing of opening or closing the light lock door can be appropriately controlled. Since the motor 12 is used for opening and closing the light lock door, the film cartridge 1 can be easily loaded or ejected with improved efficiency. Further, a separate actuator is not needed for opening and closing the light lock door, and thus the camera can be made small-sized and available at a reduced cost.

While the differential planetary gears are used in the illustrated embodiment, the present invention is not particularly limited to use of this type of gears. For example, ordinary planetary gears may be used.

In the embodiment illustrated above, the light-lock-door opening/closing detecting device 103 is provided by forming the protruding portion on the light lock door driver 5, and providing the leaf switch at a position corresponding to the protruding portion. However, the present invention is not limited to this arrangement. For example, the light-lock-door driver 5 itself may be provided with an electrical contact (brush), which is turned on and off in accordance with its rotation. Also, instead of providing the protruding portion on the light-lock-door driver 5, a leaf switch may be provided at a position corresponding to a predetermined position (for example, a corner of a distal end portion) of the light-lock-door opening/closing lever 28, and the leaf switch may be turned on and off in accordance with rotation of the light-lock-door opening/closing lever 28. Also, the light-lock-door opening/closing lever 28 itself may be provided with an electrical contact (brush) as well as above. As another example, a photo-switch may be provided instead of the leaf switch, and the open and closed states of the light lock door may be determined by detecting its ON/OFF state which changes depending upon whether the light-lock-door opening/closing lever 28 interrupts between a light-emitting portion and a light-receiving portion. Namely, any type of detector may be used provided that it can detect a part that moves in accordance with opening and closing of the light lock door.

What is claimed is:

1. A camera comprising:
   a plurality of camera components that respectively achieve camera functions by physical movement;
   a drive source that generates a driving force to move each of the plurality of camera components;
   a plurality of drive mechanisms that respectively drive the plurality of camera components to move by using said driving force;
   a switching mechanism that is coupled to said drive source and selects one of said plurality of drive mechanisms to which the driving force from said drive source is transmitted; and
   said switching mechanism switching a selection from a currently selected drive mechanism to another drive mechanism by using a force generated when movement of a camera component driven by the currently selected drive mechanism has been restricted by a factor outside the camera component driven by the currently selected drive mechanism.

2. A camera including a device that opens and closes a light lock door provided on a film cartridge loaded in the camera, the camera comprising:
   a drive source;
   an opening/closing mechanism that uses said drive source to open and close the light lock door of the film cartridge;
   a moving mechanism that uses said drive source to move a photographing lens barrel of the camera;
   a switching mechanism coupled to said drive source to select one of said moving mechanism and said opening/closing mechanism to which a driving force from said drive source is transmitted; and
   an inhibiting device that inhibits movement of the photographing lens barrel at a predetermined position even when the driving force is being transmitted to said moving mechanism;
   said switching mechanism switching a selection from said moving mechanism to said opening/closing mechanism by using a force generated when the movement of the photographing lens barrel has been inhibited at the predetermined position.

3. A camera as defined in claim 2,
wherein said inhibiting device inhibits the photographing lens barrel from being moved in a barrel retraction direction, when the photographing lens barrel is located at a predetermined most retracted position in the camera.

4. A camera as defined in claim 2,
wherein said switching mechanism comprises a planetary gear device.

5. A camera as defined in claim 4,
wherein said switching mechanism further comprises a gear that is provided with a slip mechanism.

6. A camera as defined in claim 2, further comprising:
an opening/closing detecting device that detects open state and closed state of the light lock door; and
a control device that controls an operation of said drive source based on a result of detection of said opening/closing detecting device, so as to place the light lock door in the open state or closed state.

7. A camera including a device that opens and closes a light lock door provided on a film cartridge loaded in the camera, the camera comprising:
a drive source;
a moving mechanism that uses said drive source to move a photographing lens barrel of the camera;
an opening/closing mechanism that uses said drive source to open and close the light lock door of the film cartridge;
a switching mechanism coupled to said drive source to select one of said moving mechanism and said opening/closing mechanism to which a driving force from said drive source is transmitted;
an inhibiting device that inhibits movement of the photographing lens barrel at a predetermined position even when the driving force is being transmitted to said moving mechanism;
an opening/closing detecting device that detects an open state and a closed state of the light lock door;
a control device that controls an operation of said drive source; and
a load/eject judging device that determines whether the film cartridge has been loaded in the camera or the film cartridge is to be ejected out of the camera;
said switching mechanism switching a selection from said moving mechanism to said opening/closing mechanism by using a force generated when said inhibiting device inhibits movement of the photographing lens barrel at the predetermined position when the driving force is being transmitted to said moving mechanism;
said control device stopping an operation of said drive source when said load/eject judging device determines that the film cartridge has been loaded in the camera, and said opening/closing detecting device detects the open state of the light lock door after said switching mechanism starts transmitting the driving force to said opening/closing mechanism; and
said control device also stopping an operation of said drive source when said load/eject judging device determines that the film cartridge is to be ejected out of the camera, and said opening/closing detecting device detects the closed state of the light lock door after said switching mechanism starts transmitting the driving force to said opening/closing mechanism.

8. A camera including a device that opens and closes a light lock door provided on a film cartridge loaded in the camera, the camera comprising:
a differential planetary gear device that selects a destination to which a driving force received from an actuator is transmitted;
a light lock door opening/closing mechanism that opens and closes the light lock door of the film cartridge when receiving the driving force of the actuator via said differential planetary gear device;
a barrel moving mechanism that moves in order to move a photographing lens barrel of the camera when receiving the driving force of the actuator via said differential planetary gear device;
a braking device provided in said light lock door opening/closing mechanism, which allows said light lock door opening/closing mechanism to move, thereby to open and close the light lock door, only when the drive force from said differential planetary gear device becomes equal to or greater than a predetermined threshold value; and
an inhibiting device that inhibits the photographing lens barrel from moving outside a predetermined range, and at the same time inhibits motion of said barrel moving mechanism;
a first gear of said differential planetary gear device which moves with the barrel moving mechanism being inhibited from rotating when movement of the photographing lens barrel is inhibited by said inhibiting device, so that the driving force that is equal to or greater than said threshold value is transmitted from said differential planetary gear device to said light lock door opening/closing mechanism to open and close the light lock door;
a second gear of said differential planetary gear device which moves with the light lock door opening/closing mechanism being prevented from rotating by said braking device when movement of the photograhing lens barrel is not inhibited by said inhibiting device, so that the driving force is transmitted from the differential planetary gear device to the barrel moving mechanism to move the photographing lens barrel.

9. A camera as defined in claim 8, wherein
said inhibiting device inhibits the photographing lens barrel from moving in a direction in which the photographing lens barrel is retracted.

10. A camera as defined in claim 8 wherein
said inhibiting device comprises an abutting portion formed on a member having an aperture that defines a photographing exposure range, said abutting portion being caused to abut on the photographing lens barrel, thereby to inhibit the photographing lens barrel from moving outside said predetermined range.

11. A camera as defined in claim 1, wherein the factor outside the camera component is an inhibiting device that inhibits movement of the camera component driven by the currently selected drive mechanism at a predetermined position even when the driving force is being transmitted to said camera component by said currently selected drive mechanism.

12. A camera as defined in claim 1, wherein one of said plurality of camera components is a photographing lens barrel, and said factor acts on said photographing lens barrel when said photographing lens barrel is at a predetermined position.

13. A camera as defined in claim 12, wherein one of said plurality of drive mechanisms is a moving mechanism that uses said drive source to move said photographing lens barrel, and said factor is an inhibiting device that inhibits movement of the photographing lens barrel at said predetermined position even when said driving force is being transmitted to said moving mechanism.

* * * * *